United States Patent
Shombert et al.

(10) Patent No.: US 7,694,021 B1
(45) Date of Patent: Apr. 6, 2010

(54) FIREWALL FOR GATEWAY NETWORK ELEMENTS BETWEEN IP BASED NETWORKS

(75) Inventors: Lee Shombert, Herndon, VA (US); Stephen James, South Riding, VA (US); Jennifer Carle, Vienna, VA (US); David Friedman, Roseville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1265 days.

(21) Appl. No.: 10/690,182

(22) Filed: Oct. 21, 2003

Related U.S. Application Data

(60) Provisional application No. 60/474,147, filed on May 28, 2003.

(51) Int. Cl.
*G06F 15/16* (2006.01)
(52) U.S. Cl. ...................... 709/249; 709/227
(58) Field of Classification Search .............. 709/249, 709/227
See application file for complete search history.

(56) References Cited

U.S. PATENT DOCUMENTS

| | | | |
|---|---|---|---|
| 5,623,601 A * | 4/1997 | Vu ............................... 726/12 |
| 5,781,550 A * | 7/1998 | Templin et al. ............. 370/401 |
| 5,805,805 A * | 9/1998 | Civanlar et al. ............. 709/249 |
| 6,012,088 A | 1/2000 | Li et al. ...................... 709/219 |
| 6,119,234 A | 9/2000 | Aziz et al. ................... 713/201 |
| 6,128,298 A * | 10/2000 | Wootton et al. ............. 370/390 |
| 6,138,162 A | 10/2000 | Pistriotto et al. ............ 709/229 |
| 6,233,618 B1 | 5/2001 | Shannon ..................... 709/229 |
| 6,324,648 B1 | 11/2001 | Grantges, Jr. ............... 713/201 |
| 6,484,261 B1 | 11/2002 | Wiegel ........................ 713/201 |
| 6,510,464 B1 | 1/2003 | Grantges, Jr. et al. ....... 709/225 |
| 6,892,235 B1 * | 5/2005 | Daude et al. ................ 709/224 |
| 7,181,534 B2 * | 2/2007 | Semaan et al. .............. 709/223 |
| 2003/0115485 A1 * | 6/2003 | Milliken ..................... 713/201 |
| 2005/0169282 A1 * | 8/2005 | Wittman ..................... 370/401 |

* cited by examiner

*Primary Examiner*—Larry Donaghue
(74) *Attorney, Agent, or Firm*—Cindy Kaplan

(57) ABSTRACT

Techniques for implementing a firewall in a gateway network element between two IP based networks is provided. Packets can be filtered out that specify the gateway network element as the source, where the packet comes from the network that is not visible to the other network. For example, if a packet on DCC going to the gateway network element specifies the gateway network element as the source, the packet can be discarded.

19 Claims, 4 Drawing Sheets

FIREWALL FOR GATEWAY NETWORK ELEMENTS BETWEEN IP BASED NETWORKS

BACKGROUND OF THE INVENTION

The present invention relates to firewalls in network elements. More specifically, the invention relates to firewalls in gateway network elements between IP (Internet Protocol) based networks.

SONET/SDH ADMs (Add Drop Multiplexers) and MSPPs (Multi Service Provisioning Platforms) use SONET/SDH overhead bytes to establish communication channels between nodes. These communication channels are called DCCs.

In configuring ADMs and MSPPs, special purpose nodes, referred to as GNEs (Gateway Network Elements), act to terminate the DCCs and to forward management traffic across a DCN (Data Communications Network) to the NOC (Network Operations Center).

The industry specification for SONET/SDH ADMs was originally included in GR-253, the contents of which are herein incorporated by reference in their entirety, and it prescribed an OSI communication stack for DCCs. Because DCNs traditionally used IP based communication, the GNE became a natural demarcation between the OSI based DCC and the IP based DCN. This demarcation has become well understood and several features of the behavior of SONET ADMs and MSSPs have developed as a consequence of this OSI/IP separation enforced on the GNEs.

Today, the industry standard G.7712, the contents of which are herein incorporated by reference in their entirety, allows IP DCCs as a standard option. Thus, the DCN and DCC can both be IP based.

The problem that has been encountered is that users have come to rely on certain features of the separation between an OSI based DCC and an IP based DCN, but, in a system with an IP based DCC, this separation and these features are missing. In a system with a GNE between two IP based networks, there is a strong need for the GNE to have an onboard separation between the networks that mimics the features of the separation between the OSI based DCC and the IP based DCN found in legacy systems. Additionally, it would be desirable if the GNE implemented this onboard.

SUMMARY OF THE INVENTION

The present invention provides innovative techniques for implementing a firewall in a gateway network element between two IP based networks. In general, packets can be filtered out that specify the gateway network element as the source, where the packet comes from the network that is not visible to the other network. For example, if a packet on DCC going to the gateway network element specifies the gateway network element as the source, the packet is discarded. This can prevent malicious packets from being directed at a network element on the DCN. Some specification embodiments of the invention are described below.

In one embodiment, the invention provides a gateway network element that provides access to network elements that are not directly reachable. The gateway network element comprises a processor that is directed by code. Additionally, the gateway network element comprises code that receives and sends packets over a first IP based interface to the first network; code that receives and sends packets over a second IP based interface to the second network, wherein IP addresses of network elements in the second network are not visible to network elements in the first network; and code that filters out packets received over the second IP based interface that specify the gateway network element as the source.

In another embodiment, the invention provides a method for providing access to network elements that are not directly reachable. Packets are sent and received over a first IP based interface to the first network. Packets are also sent and received over a second IP based interface to the second network, wherein IP addresses of network elements in the second network are not visible to network elements in the first network. Packets received over the second IP based interface that specify the gateway network element as the source are filtered out.

Other features and advantages of the invention will become readily apparent upon review of the following description in association with the accompanying drawings, where the same or similar structures are designated with the same reference numerals.

DETAILED DESCRIPTION OF EMBODIMENTS

In the description that follows, the present invention will be described in reference to embodiments that are used in association with the Cisco Transport Controller (CTC). CTC is a Java application that is typically run from a laptop PC. However, embodiments of the invention are not limited to any particular environment, protocol, application, or implementation. For example, although embodiments of the invention will be described in association with CTC, the invention can be advantageously applied to other systems with similar connectivity. Therefore, the description of the embodiments that follows is for purposes of illustration and not limitation.

Figure 1:
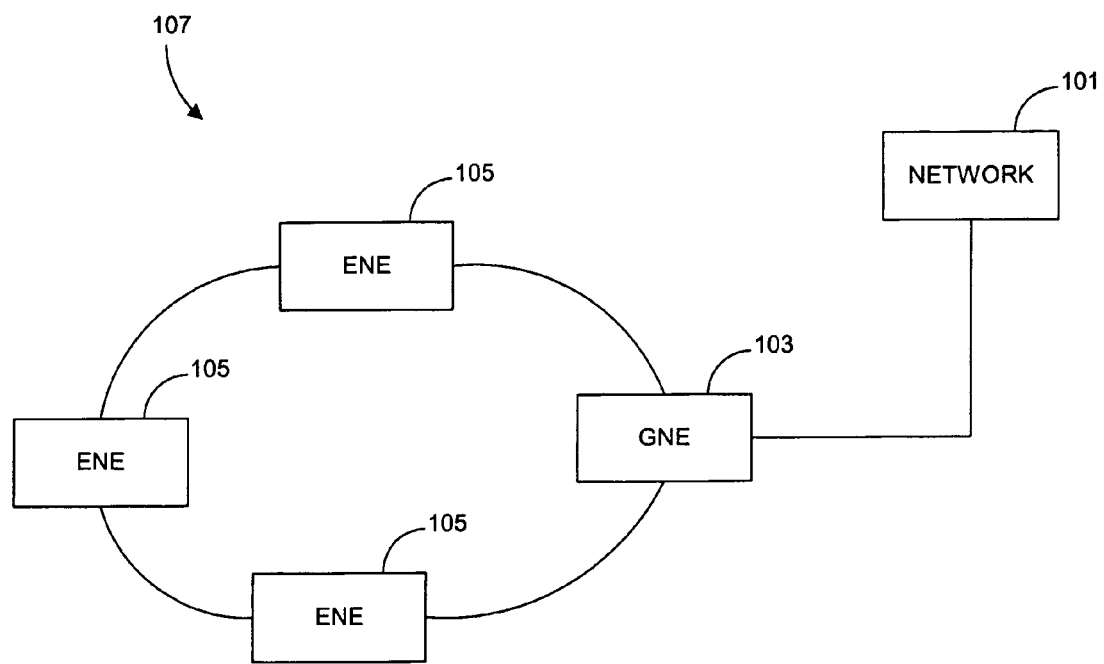
FIG. 1 shows a block diagram of an example network environment where a GNE can act as a gateway between two IP based networks.

FIG. 1 shows of an example network environment where a GNE can act as a gateway to provide access to network elements that are otherwise unreachable. Network 101 can include any number of network elements including routers, switches, hubs, servers, computer systems, and the like. Network 101 uses an IP based interface to communicate with GNE 103. The IP address of GNE 103 is visible to network 101 and therefore packets can be sent directly from network elements in network 101 to GNE 103.

ENEs (External Network Elements) 105 are in network 107 with GNE 103. ENEs are network elements that are not directly reachable from outside the network. Thus, network elements in network 101 should not be able to directly access ENEs 105. GNE 103 provides access to ENEs 105 so network elements in network 101 go through GNE 103 to communicate with ENEs 105.

As described above, if an OSI based interface (DCC) is utilized in network 107, there is a natural demarcation between the OSI and IP interface networks supporting the feature that ENEs are not directly reachable from outside network 107 (e.g., from network elements in network 101).

However, in embodiments of the invention, an IP based interface is utilized to communicate between network elements in network 107.

As network 101 and network 107 both utilize IP based interfaces to communicate, the natural demarcation between the networks is not present. However, it is desirable to provide many of the features that are available in OSI/IP based heterogeneous networks.

Embodiments of the invention provide a firewall in GNE 103 that, among other things, make it so that ENEs 105 are unreachable directly by network elements in network 101. The firewall is a software executing entity directed by code that scans packets that are received by and are to be sent by GNE 103 to ensure that the packets do not violate one or more rules. If a packet violates a rule, the packet is discarded. In other embodiments, one or more of the packets to be discarded can be saved or forwarded for analysis.

The firewall on GNE 103 examines packets that it receives from ENEs 105 on network 107. If a packet specifies as the source address the IP address of the GNE, the packet is discarded. Such a packet could be utilized as a one way attack on a network element on network 101. It is preferable that the firewall be implemented onboard the GNE so that this rule can be more readily enforced.

Additionally, the firewall on GNE 103 can adhere to a rule that all packets being sent from GNE 103 to network 101 specify the source address as the GNE. Thus, packets are sent to network 101 only when the packets specify the GNE as the source. This ensures that the IP addresses of ENEs 105 are not provided to network elements in network 101.

The firewall on GNE 103 can also examine packets coming from network 101. A rule can be enforced that packets received by GNE 103 from network 101 must specify the GNE as the destination address or be a multicast message.

Figure 2:
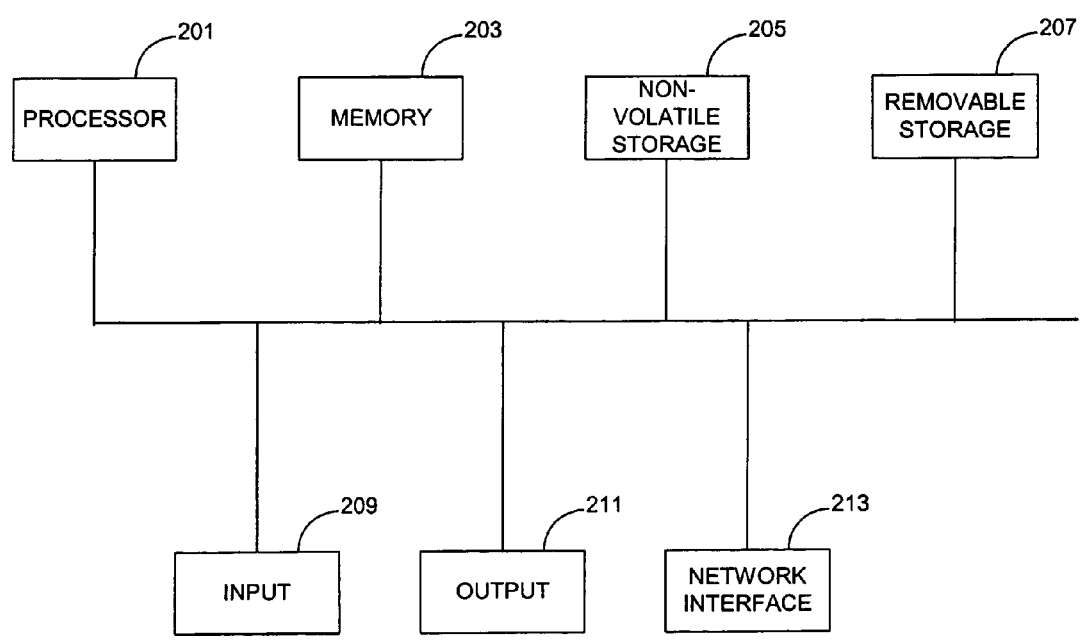
FIG. 2 illustrates a block diagram of a network device, computer system or subsystems thereof that can utilize embodiments of the invention.

Now that the general operation of an embodiment of the GNE has been described, FIG. 2 shows a block diagram of components that can be present in network devices and computer systems that implement embodiments of the invention. A processor 201 executes code (or instructions) that direct the operation of the processor. Although processors typically have memory caches, processor 201 utilizes memory 203, which can store code and data.

A non-volatile storage 205 can store code and data such that it is typically persistent and provides more storage when compared to memory 203. At present, a common non-volatile storage is one or more hard drives. A removable storage 207 provides mobility to code and/or data that are stored thereon. Examples of removable storage are floppy disks, tape, CD/ROM, flash memory devices, and the like.

Memory 203, non-volatile storage 205 and removable storage 207 provide examples of computer readable storage media that can be utilized to store and retrieve computer programs incorporating codes that implement the invention, data for use with the invention, and the like. Additionally, a data signal embodied in a carrier wave (e.g., in a network including the Internet) can be the computer readable storage medium. An input 209 allows a user to interface with the system. Input can be done through the use of a keyboard, a mouse, buttons, dials, or any other input mechanism. An output 211 allows the system to provide output to the user. Output can be provided through a monitor, display screen, LEDs, printer or any other output mechanism. Input and/or output can also be performed externally through a network interface 213.

Network interface 213 allows the system to interface with a network to which it is connected. The components shown in FIG. 2 can be found in many network devices and computer systems. However, components can be added, deleted and combined so FIG. 2 is for illustration purposes. Additionally, these components can also be present on subsystems (e.g., cards) in network devices and computer systems.

Figure 3:
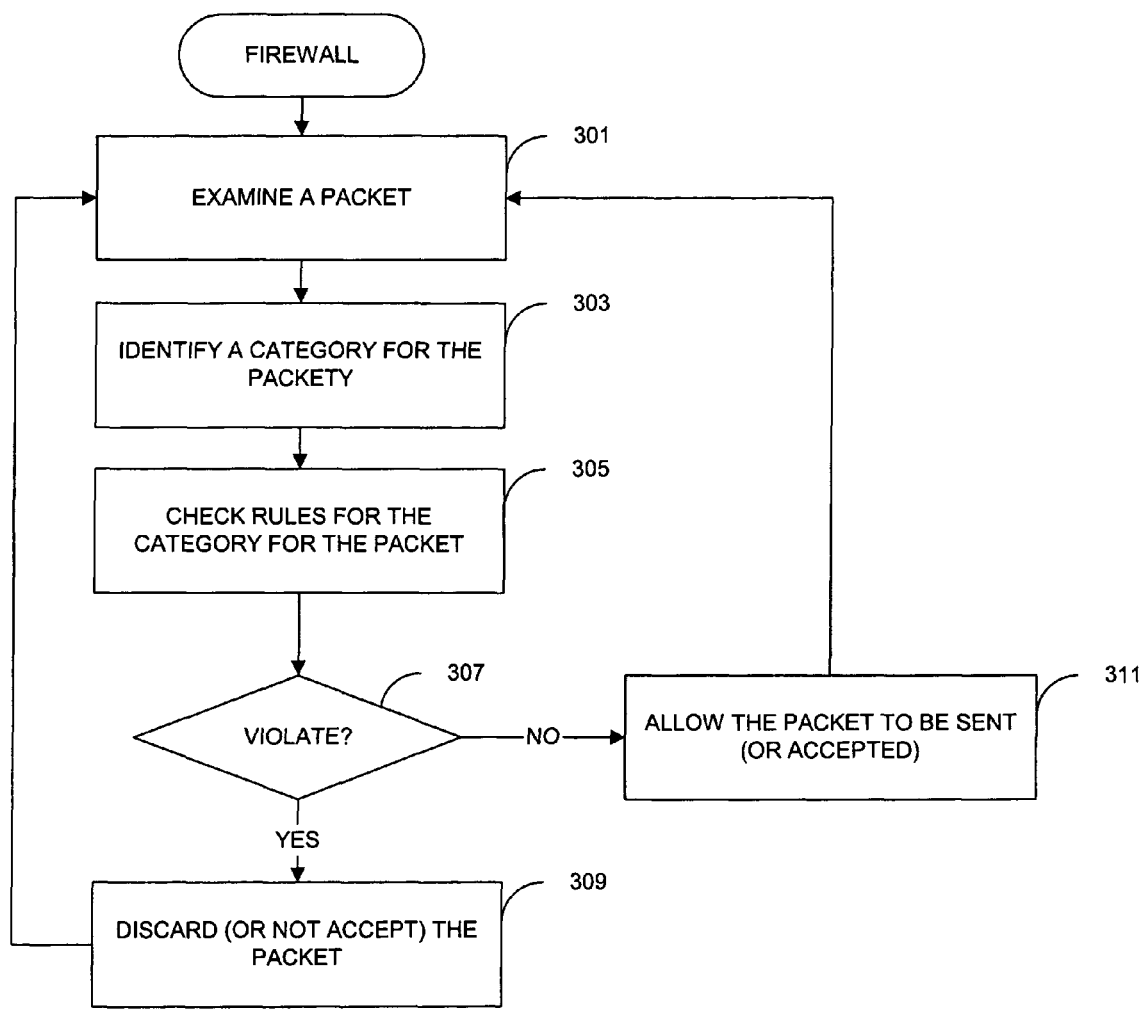
FIG. 3 shows a flowchart of a process that implements a firewall at the GNE.

FIG. 3 shows a flowchart of a process that implements a firewall at the GNE according to the invention. The steps shown in FIG. 3 are for illustrative purposes and steps can be added, deleted, combined, or reordered without departing from the spirit and scope of the invention.

At a step 301, a packet is examined. The packet can be a packet that the GNE has received from either network or it can be a packet that the GNE is going to send (or forward). A category for the packet is identified for the packet at a step 303. In order to organize the rules for the firewall, the packets can be categorized with associated rules. For example, a category can be packets that are received from the network including the ENEs (e.g., network 107 in FIG. 1) and another category can be packets that are received from the network not including the ENEs (e.g., network 101 in FIG. 1).

Additionally, packets that designate the GNE as the destination can be a separate category, which can further be divided in to categories based on from which network the packet was received. Exemplary categories and rules for one embodiment will be described in more detail in reference to FIG. 4.

At a step 305, the rules are checked for the category for the packet. If the packet is found to violate a rule at a step 307, the packet can be discarded (or not accepted) at a step 309. Information regarding the discarded the packet can be stored or sent to a network device for analysis. Otherwise, the packet is allowed to be sent (or accepted) at a step 311.

Figure 4:
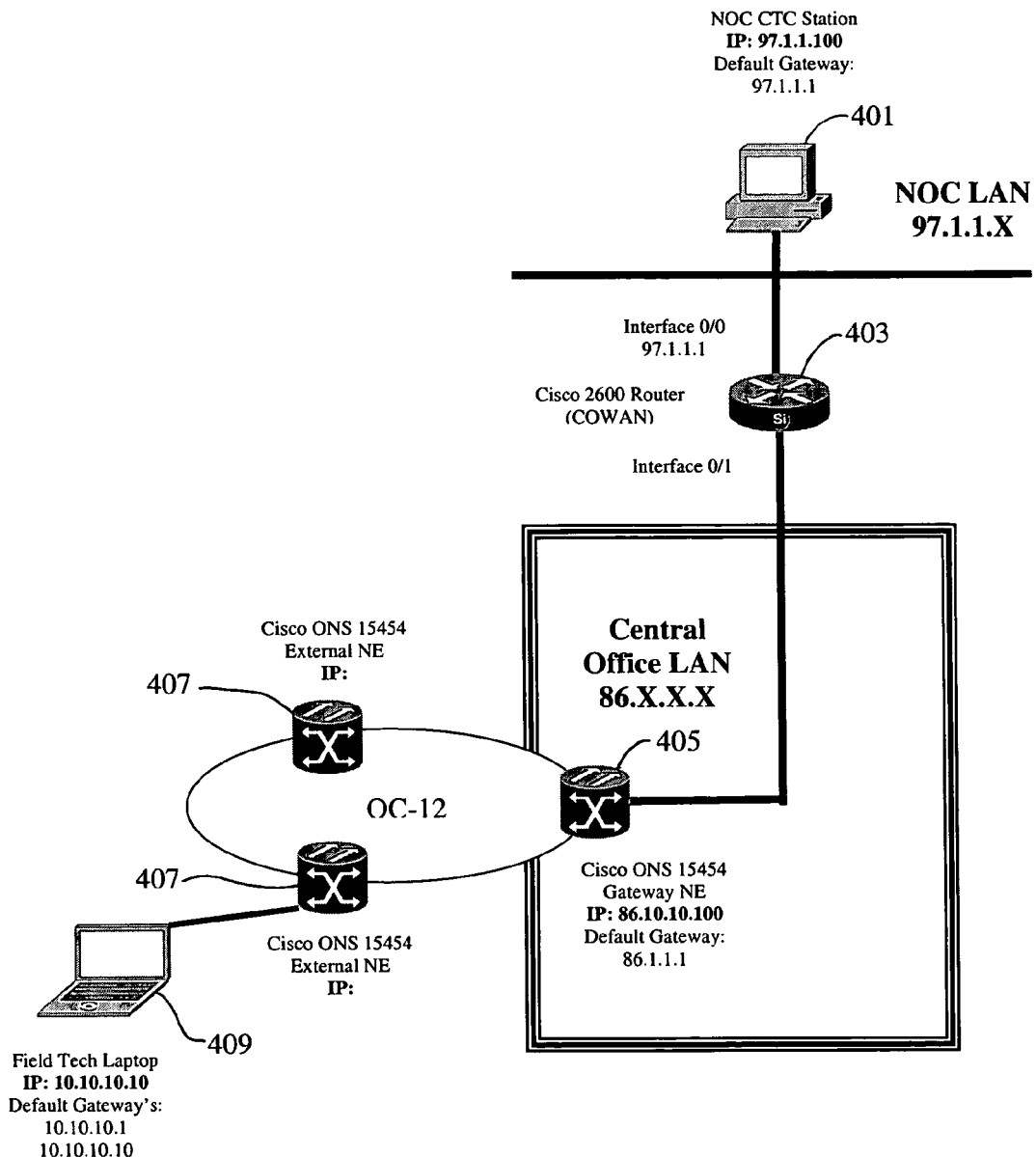
FIG. 4 illustrates a block diagram of an example network environment including a NOC that is in communication through a WAN with multiple central office LANs.

Now that a general description has been provided, it may be beneficial to describe a more specific embodiment. FIG. 4 shows a block diagram of an example network environment including a Network Operations Center (NOC) that is in communication through a WAN with multiple central office LANs.

A NOC CTC station 401 is connected to multiple central offices through a COWAN (Central Office Wide Area Network or WAN). The connection of NOC CTC station 401 to the COWAN is via a router 403 that may use Network Address Translation (NAT). Router 403 prevents unauthorized inbound connections from the COWAN and the central office LANs. However, router 403 does allow connections from the NOC into the COWAN.

At each central office there is a LAN, which interconnects GNEs. Each GNE is the access point to a ring of other NE's that are outside of the central office. As discussed above, ENEs are NEs are not reachable from outside the network (e.g., the NEs can be outside of the central office itself).

As shown, a GNE 405 acts as the gateway to ENEs 407. Field technicians that connect directly to the ENEs in the field are only allowed access to the NEs in that ring, and are not permitted to access other NE's on other rings in the central office, nor are they allowed to access any systems on or behind the COWAN.

Field technicians can connect to ENEs using laptop 409, such as a WINDOWS laptop with a static IP addresses. Field technicians typically do not have system administrator privileges that allow them to change network settings.

GNE 405 has two different IP interfaces, which can be called the Ethernet interface for traffic from router 403 and the DCC IP interface for traffic from ENEs 407. GNE 405 can act as a firewall that isolates the DCC IP traffic from Ethernet traffic. When the firewall is enabled, the GNE accepts a limited set of packets. The filtering rules depend on the interface at which the packet arrives, which define different categories.

Packets arriving on the ethernet interface are accepted only if their destination address is as follows:
1. the GNE itself
2. the GNE's subnet broadcast address
3. within the 224.0.0.0/8 network (this is a reserved network that is used for standard multicast messages)

Packets arriving on the DCC interface are accepted only if their destination address is as follows:
1. the GNE itself
2. an OSPF peer (another NE in the DCC mesh)
3. within the 224.0.0.0/8 network (this is a reserved network that is used for standard multicast messages)

If the packet is addressed to GNE 405 itself, this can create another category and additional rules are applied. Packets arriving on the Ethernet interface are tested as follows:
1. UDP packets addressed to the SNMP trap relay port (391) are rejected
2. All other packets are accepted Packets arriving on the DCC interface are tested as follows:
1. UDP packets addressed to the SNTP port are accepted
2. UDP packets addressed to the DHCP port are accepted
3. UDP packets are otherwise accepted
4. TCP packets addressed to the telnet port are rejected
5. TCP packets addressed to the IO card telnet ports are rejected
6. TCP packets addressed to the proxy server port are rejected
7. TCP packets are otherwise accepted
8. OSPF packets are accepted
9. ICMP packets are accepted
10. All other packets are rejected As discussed above, packets that are rejected can be silently discarded. The preceding have been exemplary categories and rules for one embodiment of the firewall. Other embodiments can utilize other categories and rules so the invention is not limited to the specific embodiments described herein.

In some embodiments, a "proxy server" task runs on the GNE. The proxy server provides functionality similar to, and for the same reason as, a SOCKS proxy server. More information about the SOCKS Protocol can be found in SOCKS Protocol Version 5 IETF RFC 1928, which is hereby incorporated by reference. The proxy server tunnels connections between a client (e.g., a CTC workstation) and a target (e.g., a DCC-connected NE).

The proxy server thus can act as a bridge between any two endpoints that might not otherwise be able to communicate. Each endpoint should be able to communicate with the proxy server. The proxy server on the GNE provides forwarding from DCN IP addresses to DCC IP addresses While the above is a complete description of preferred embodiments of the invention, various alternatives, modifications, and equivalents can be used. It should be evident that the invention is equally applicable by making appropriate modifications to the embodiments described above. For example, although the invention has been described in relation to specific embodiments, the invention can be advantageously applied to other embodiments. Therefore, the above description should not be taken as limiting the scope of the invention as defined by the metes and bounds of the appended claims along with their full scope of equivalents

The invention claimed is:

1. A gateway network element that provides access to network elements that are not directly reachable, comprising:
a processor that is directed by code;
code that receives and sends packets over a first IP based interface to a first network;
code that receives and sends packets over a second IP based interface to a second network, wherein IP addresses of network elements in the second network are not visible to network elements in the first network;
code for categorizing the received packets based on the interface over which the packet was received, type of packet, and whether the destination address specifies the gateway network element; and
code that selects and applies a set of filtering rules to the categorized packets based on a category of the received packet, wherein each set of said filtering rules differ from said other sets of filtering rules and comprises rules specifying which of said packets are accepted and which of said packets are rejected;
wherein the first network is a Data Communications Network (DCN) and the second network is a Data Communication Channel (DCC) and the code that applies said filtering rules provides separation between the DCN network and the DCC network.

2. The gateway network element of claim 1, further comprising code that sends packets over the first IP based interface only when the packets specify the gateway network element as the source.

3. The gateway network element of claim 1, further comprising code that accepts all packets received over the first IP based interface in which the destination address specifies the gateway network element, a subnet broadcast address, or a multicast address and rejects all other packets.

4. The gateway network element of claim 1, further comprising code that implements a proxy server that provides forwarding between IP address of the first and second networks.

5. A gateway network element that provides access to network elements that are not directly reachable, comprising:
a processor that is directed by code;
means for receiving and sending packets over a first IP based interface to a first network;
means for receiving and sending packets over a second IP based interface to a second network, wherein IP addresses of network elements in the second network are not visible to network elements in the first network;
means for categorizing the received packets based on the interface over which the packet was received, type of packet, and whether the destination address specifies the gateway network element; and
means for selecting and applying a set of filtering rules to the categorized packets based on a category of the received packet, wherein each set of said filtering rules differ from said other sets of filtering rules and comprises rules specifying which of said packets are accepted and which of said packets are rejected;
wherein the first network is a Data Communications Network (DCN) and the second network is a Data Communication Channel (DCC) and the code that applies said filtering rules provides separation between the DCN network and the DCC network.

6. A method for providing access to network elements that are not directly reachable, comprising:
receiving and sending packets over a first IP based interface to a first network;
receiving and sending packets over a second IP based interface to a second network, wherein IP addresses of network elements in the second network are not visible to network elements in the first network;

categorizing the received packets based on the interface over which the packet was received, type of packet, and whether the destination address specifies the gateway network element; and selecting and applying a set of filtering rules to the categorized packets based on a category of the received packet, wherein each set of said filtering rules differ from said other sets of filtering rules and comprises rules specifying which of said packets are accepted and which are rejected;

wherein the first network is a Data Communications Network (DCN) and the second network is a Data Communication Channel (DCC) and applying said filtering rules provides separation between the DCN network and the DCC network.

7. The method of claim 6, further comprising sending packets over the first IP based interface that specify the gateway network element as the source.

8. The method of claim 6, further comprising accepting all packets received over the first IP based interface in which the destination address specifies the gateway network element, a subnet broadcast address, or a multicast address and rejecting all other packets.

9. The method of claim 6, further comprising accepting all packets received over the second IP based interface in which a destination address specifies the gateway network element, a network element in the second network or a multicast address and rejecting all other packets.

10. The method of claim 6, further comprising implementing a proxy server that provides forwarding between IP address of the first and second networks.

11. The gateway network element of claim 1 further comprising:

code that accepts packets received over the first IP based interface comprising a destination address which specifies the gateway network element, a subnet broadcast address, or a multicast address; and code that accepts packets received over the second IP based interface comprising a destination address which specifies the gateway network element, a network element in the second network or a multicast address;

code that drops all other packets received over the first or second IP based interface.

12. The gateway network element of claim 1 wherein one set of filtering rules filters packets received over the first IP based interface with a destination address of the gateway network element and another set of filtering rules filters packets received at the second IP based interface with a destination address of the gateway network element.

13. The gateway network element of claim 1 further comprising code that tunnels connections between a client node and a DCC-connected network element.

14. The gateway network element of claim 1 wherein the first network comprises to a Wide Area Network (WAN) and the second network comprises a Local Area Network (LAN).

15. The gateway network element of claim 5 further comprising means for forwarding filtered packets for analysis by the processor.

16. The gateway network element of claim 5 wherein one set of filtering rules filters packets received over the first IP based interface with a destination address of the gateway network element and another set of filtering rules filters packets received at the second IP based interface with a destination address of the gateway network element.

17. The gateway network element of claim 5, further comprising means for implementing a proxy server that provides forwarding between IP addresses of the first and second networks.

18. The gateway network element of claim 1 wherein one of said categories comprises packets received from the first network and another of said categories comprises packets received from the second network.

19. The gateway network element of claim 18 wherein one of said categories comprises packets addressed to the gateway network element.

* * * * *